United States Patent

[11] 3,596,068

[72] Inventor Harold W. Doyle
Newport Beach, Calif.
[21] Appl. No. 787,929
[22] Filed Dec. 30, 1968
[45] Patented July 27, 1971
[73] Assignee California Computer Products, Inc.
Anaheim, Calif.

[54] SYSTEM FOR OPTIMIZING MATERIAL UTILIZATION
14 Claims, 20 Drawing Figs.

[52] U.S. Cl. .......... 235/150, 33/17, 33/11, 340/172.5, 235/151
[51] Int. Cl. .......... G06f 15/00
[50] Field of Search .......... 33/11, 17; 235/151; 340/172.5

[56] References Cited

UNITED STATES PATENTS 1,047,823 12/1912 Marsden .......... 33/12 UX
2,170,826 8/1939 McMaster .......... 33/17 X
3,391,392 7/1968 Doyle .......... 340/172.5

FOREIGN PATENTS 1,016,038 1/1966 Great Britain .......... 235/151

*Primary Examiner*—Eugene G. Botz
*Attorney*—John A. Duffy

ABSTRACT: Patterns can be automatically arranged on the surface of a material in a manner which will require less material than that which is consumed by a competent human performing the same task. The simulated movement of each pattern piece about an already established marker boundary may be accomplished by data processing techniques. Once the contour of a piece outline and the boundary outline is known and the slopes of the vertex connecting segments determined, the displacing moves of the piece about the boundary may be carried out in a nonoverlapping manner. In such a system it is only necessary to examine the trial marker dimension after each move in order to ascertain whether the new position is a preferred location.

INVENTOR.
HAROLD W. DOYLE
BY John A. Duffy
ATTORNEY.

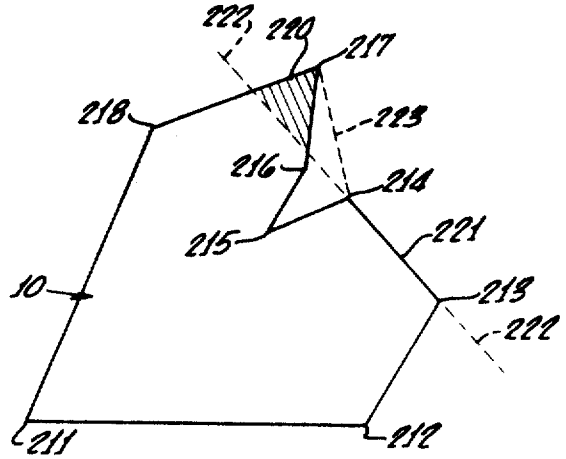
FIG. 2.
| DATA POINT | X | Y | Z |
|---|---|---|---|
| a | 0100 | 0011 | 0 |
| b | 0110 | 0011 | 0 |
| c | 1100 | 0101 | 0 |
| d | 1010 | 0111 | 1 |
| e | 1000 | 0111 | 1 |
| f | 1000 | 1011 | 0 |
| g | 0110 | 1011 | 0 |
| h | 0100 | 1001 | 0 |
| a | 0100 | 0011 | 0 |
FIG. 3b.
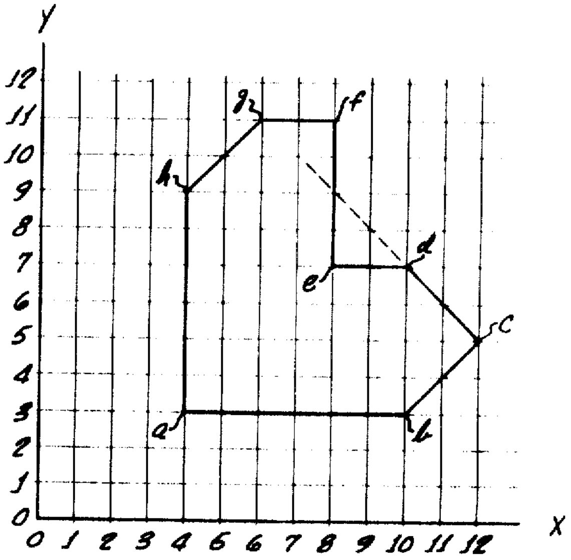
FIG. 3a.
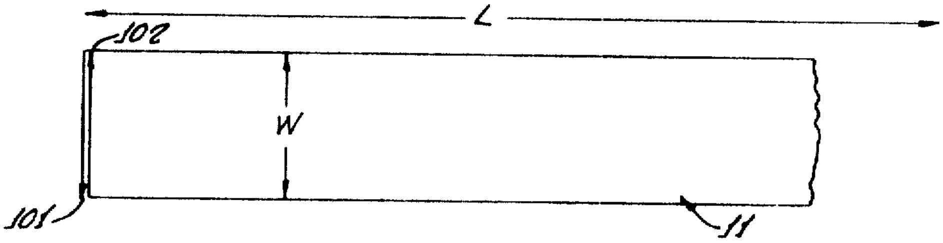
FIG. 4a
| DATA POINT | X | Y | Z |
|---|---|---|---|
| 101 | 0 | 0 | 0 |
| 102 | 0 | W | 0 |
| 101 | 0 | 0 | 0 |
FIG. 4b.
W=01101
INVENTOR
HAROLD W. DOYLE
BY John W. Duffy
ATTORNEY.

INVENTOR
HAROLD W. DOYLE
BY John A. Duffy
ATTORNEY.

INVENTOR.
HAROLD W. DOYLE
BY John A. Duffy
ATTORNEY.

INVENTOR.
HAROLD W. DOYLE
BY John A. Duffy
ATTORNEY.

INVENTOR
HAROLD W. DOYLE

BY John A Duffy

ATTORNEY.

INVENTOR
HAROLD W. DOYLE
BY John A Duffy
ATTORNEY.

SYSTEM FOR OPTIMIZING MATERIAL UTILIZATION

CROSS-REFERENCE TO RELATED APPLICATIONS

"Method and Apparatus for Pattern Data Processing," Harold W. Doyle, U.S. Pat. No. 3,391,392, issued July 2, 1968.

"Automatic Corner Recognition System," Harold W. Doyle, Ser. No. 716,918, filed Mar. 28, 1968.

BACKGROUND OF THE INVENTION

The cutting of predetermined shaped patterns, or templates, from continuous flat stock of fixed width is a frequent task in certain industries. For instance, in the apparel industry garment pattern pieces are cut from flat or tubular fabric; in the automobile industry seat coverings and headliners are cut from upholstery fabric; in the container industry carton blanks are cut from corrugated or pasteboard stock; in the metalworking industry metal parts are cut from plate metal under control of master part templates. In these and other instances considerable attention is given to laying out the required pieces in an arrangement calculated to minimize material waste between the emplaced templates. The resulting cutting plan is called a "marker" or "stencil."

A broad statement of this problem is: for a predetermined set of patterns to be cut from a continuous material of predetermined fixed width, find the arrangement of these patterns that minimizes the total length of material needed to produce the given patterns. In a practical sense this solution is seldom, if ever, attained because of the formidable number of combinations of pieces that are possible for the given set of patterns. An acceptable optimum solution could be defined as an arrangement of pieces that requires less material on the average than a high percentage, say 90 percent, of attempted manual arrangements. The percentage may be set by the manufacturer to balance the expected material cost savings against the costs of repeated trials.

Accordingly, an object of the present invention is to provide a system for automatically minimizing the length of material required for such an optimum solution.

Another object of the invention is to provide a system for plotting a preferred placement of geometric entities.

A further object of the invention is to provide a system which will automatically produce pieces of material from a flat stock in such a way as to reduce the amount of material waste below that which would result if the process were carried out by skilled human operators.

SUMMARY OF THE INVENTION

The system for optimizing material utilization described herein comprises a means for presenting a digitized representation of a sequence of geometric shapes, a data processing unit for adjusting the data so presented so as to simulate a physical displacement of the piece about the surface of a material upon which the pieces are to be placed, and an output means for producing the patterns, e.g., a cutter or a plotting device for drawing the resultant placement for future reference. The data processing unit operates upon the incoming digitized data in accordance with a set of prescribed rules to place the pieces at locations which generally will cause less material waste than that which would result if the pieces were placed by a skilled human operator. By continuously adjusting the piece data so as to correspond with a physical displacement of the piece about an already-established marker boundary which is the result of prior piece placements, each new piece may be positioned in a location which will minimize the amount of additional material length required. The adjustment of data corresponding to a displacement of the piece relative to the boundary is analogous to a sliding of the piece relative to the marker boundary in such a way that the piece at no time overlaps (or interferes with) the already-established marker boundary. Because the displacements are nonoverlapping, each new displacement of the piece need only be tested to ascertain whether the resulting placement would increase the length of the marker boundary in order to determine whether the new position is superior to a prior location.

DESCRIPTION OF THE DRAWINGS

FIG. 2 shows a typical situation which may arise with a piece having a concave boundary segment.

FIG. 3*a* illustrates a typical piece.

FIG. 3*b* illustrates the corresponding data array for the piece shown in FIG. 3*a*.

FIG. 4*a* shows the relationship of the initial degenerate boundary to the uncut material.

FIG. 4*b* shows the corresponding data array of the degenerate boundary.

DESCRIPTION OF A PREFERRED EMBODIMENT

Presented hereinbelow is a solution to the problem of automatically arranging a predetermined sequence of arbitrarily shaped patterns in an organized and controlled fashion so as to decrease the amount of space required to less than that utilized by competent human operators performing the same task manually in a reasonable amount of time. As is the case with many automatic techniques, the superlativeness of the process will depend upon the complexity of the decision-making process involved. In the description of the present invention, two basic ground rules are employed to greatly simplify an exceedingly complex problem. First, it will be assumed that the order in which the pieces are to be selected for placement has already been established by an independent process. Secondly, the orientation of each piece relative to the material boundaries will also have been previously determined except that the pieces themselves may be reversed (flipped) end for end about the piece length axis to present a reversed view, inverted side to side about the piece width axis to present an inverted view, or a combination reversed/inverted view, depending upon what view is called for by the external commands.

As a preliminary fact, the material itself will be deemed to have a width which is greater than the transverse dimension of any piece. The length of the material will normally be many times the width dimension, and for the purposes of the present explanation, it may be assumed to be a bolt of cloth having an extensive lengthwise dimension, the problem thus being reduced to that of automatically positioning a predetermined sequence of preoriented pieces within a spacing having a width, W, so as to save on the total length, L, of material required.

Figure 1:
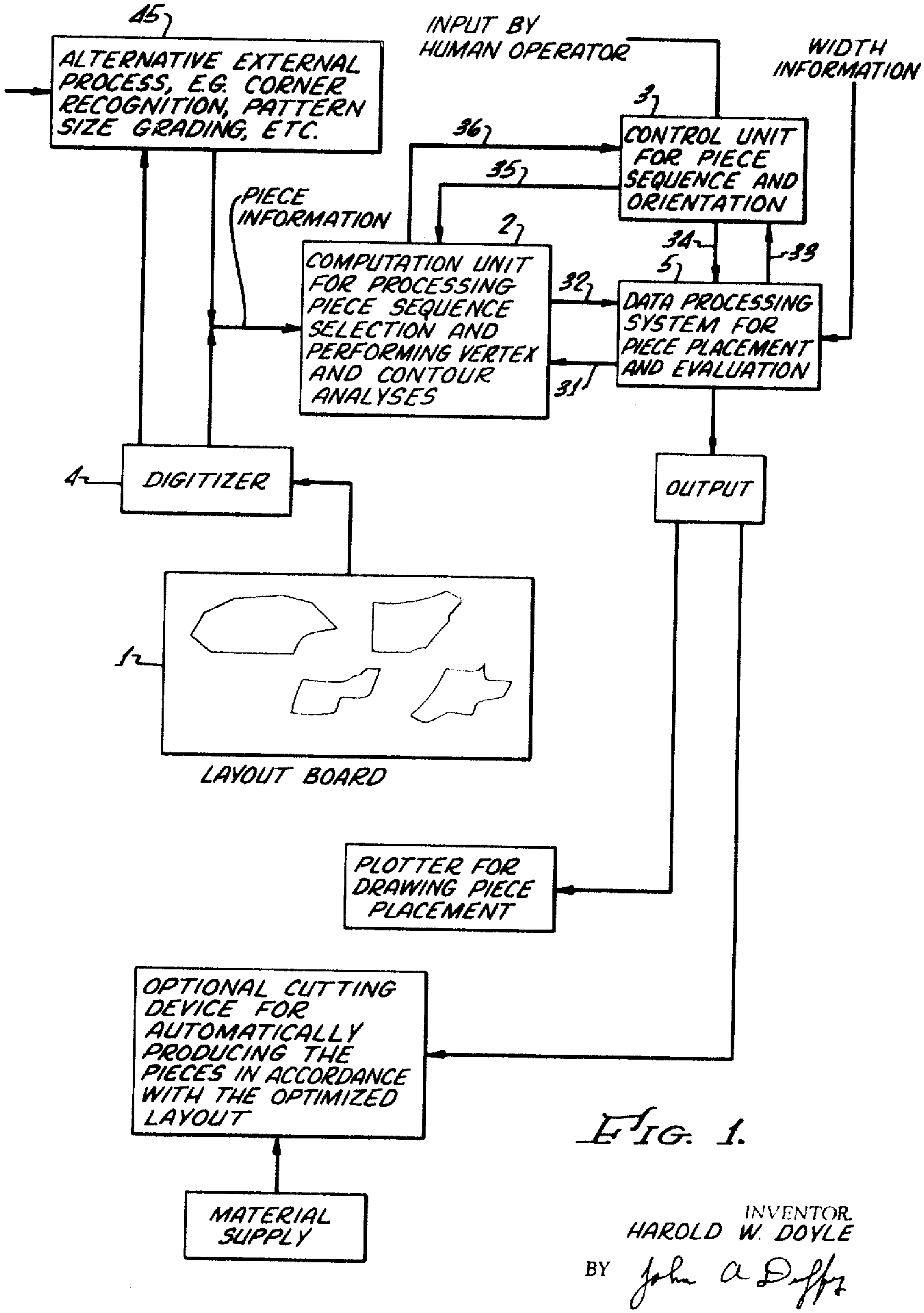
FIG. 1 shows the interrelationship between operative elements of the invention.

FIG. 1 illustrates the interrelation between a group of operative elements which would typically be employed to carry out the automatic marking process. Initially, the shape and size of the individual pieces are decided upon by a human operator and the templates are prepared as shown on the drawing board 1. The individual pieces are next digitized (boundaries defining each piece converted to arrays of digital coordinate positional information) by either a manual or automatic digitizing process 4 and the resultant information directly supplied to a computational unit 2. Alternatively, the digitized data may be first externally processed 45 according to prescribed dictates, to identify vertices (those locations having a high degree of curvature) and optionally, other control points of interest (see U.S. Pat. No. 3,391,392 and application, Ser. No. 716,918) which may have significance in related operations such as corner recognition and pattern grading. The computational unit 2 communicates with a control unit 3 to assemble and convert the digitized representations of the pieces in accordance with externally supplied rules which determine both the orientation of the individual pieces and the sequence in which the pieces are to be presented for placement. The rules of choice which control this phase of the process may be the result of the logical conclusions of a human operator, or alternatively, the selection and orientation criteria may be supplied by another automatic decision-making routine, the details of which are not shown as they form no part of the present invention.

A second function performed by the computational unit 2 is that of testing each vertex of the individual pieces for concavity of convexity of the piece boundary. This information is essential in order to carry out the placement process of the present invention as described hereinbelow. Although this function is normally performed on the individual piece data after the data has been presented for placement (see FIG. 5) the mechanics of the process will be described at this point (so as to facilitate an uninterrupted description of the placement process) as it is in reality a separate decision-making calculation which is independent of the placement process. As will be explained below, it is also necessary to determine the concavity or convexity of the boundary contour at vertices representing the developing boundary of the marker and the following description is equally applicable thereto.

The boundary contour at each vertex is determined by a point-by-point inspection of the digitized data representing a boundary or perimeter. The convention employed for the purposes of the present description is that of assigning a binary "0" to left turns and a binary "1" to right turns as the piece-defining boundary is circumscribed in a counterclockwise manner. Thus, if a particular vertex is convex (as would be the case for each of the corner points of a regular polygon for example), the vertex would be tagged with a binary "0," whereas if the vertex were concave (as would be the case for nearly half of the points defining the shape of a crescent), it would be flagged with a binary "1." For reasons to be explained below, the convention adopted herein for the labeling of the individual vertices as concave or convex is one which requires an entire group of points to be labeled as concave when the points, taken as a whole, describe a concave boundary contour even though local fluctuations of the boundary may appear to be convex. Thus, in FIG. 2 the piece 10 is shown to have vertices at 211, 212, 213, 214, 215, 216, 217, and 218. If it were not for the protruding crosshatched section 220, the vertex as 213 would be tagged with a binary "0," indicating a convex curvature, i.e., in proceeding from 212 to 213 to 214 a left turn is made. However, for reasons that will be made apparent later, the definition concave must be extended for purposes of this invention to apply to any point defining the boundary, for which any other boundary-defining point lies to the right of the extended line segment joining the point under consideration to the next sequential point on the boundary. Thus, vertex 217 is seen to lie to the right of the extended line segment joining 213 and 214, and 213 is accordingly declared to be convex. Viewed another way, the line segment 221 joining the vertices 213 and 214 and the line segment 223 joining 214 and 217 form an incurvated boundary and the vertex 214 is tagged accordingly.

When a particular piece has been selected for placement (as for example the pattern shown in FIG. 3*a*) the data representing that piece may be assembled in an array similar to that shown in FIG. 3*b*. The X and Y entries in the array represent the Cartesian coordinates of each vertex of the piece while the third column (labeled Z) is reserved for the purpose of indicating the contours (whether convex or concave as per the conventions delineated hereinabove). For the piece shown in FIG. 3*a* (which consists only of straight line segments) the array (FIG. 3*b*) consists of only 9 entries, it being understood, however, than an array may include as large a number of data points as may be required to faithfully represent a highly curved boundary.

Once the data arrays have been assembled, the emplacement of each piece in accordance with the method of the present invention may be carried out. This operation is accomplished by the data processing system 5 which communicates via the lines 31—36 with the control information unit 3 and data computational unit 2, it being understood that an actual hardware implementation of the three functional units might typically be incorporated in a single machine.

Initially, the width W of the material is transmitted to the placement data processor 5 along with data representing the left border. As shown in FIG. 4*a*, the left border of the material 11 is typically a straight line, the defining data consisting of only 3 points which describe a degenerate boundary, extending from the point 101 and 102 and back again to 101. Once the initial border information has been received, the contour tags may be computed and the information arranged in an array format as shown in FIG. 4*b*. At this point, a data array representing the first piece to be placed is processed and the placement routine initiated.

Figure 5:
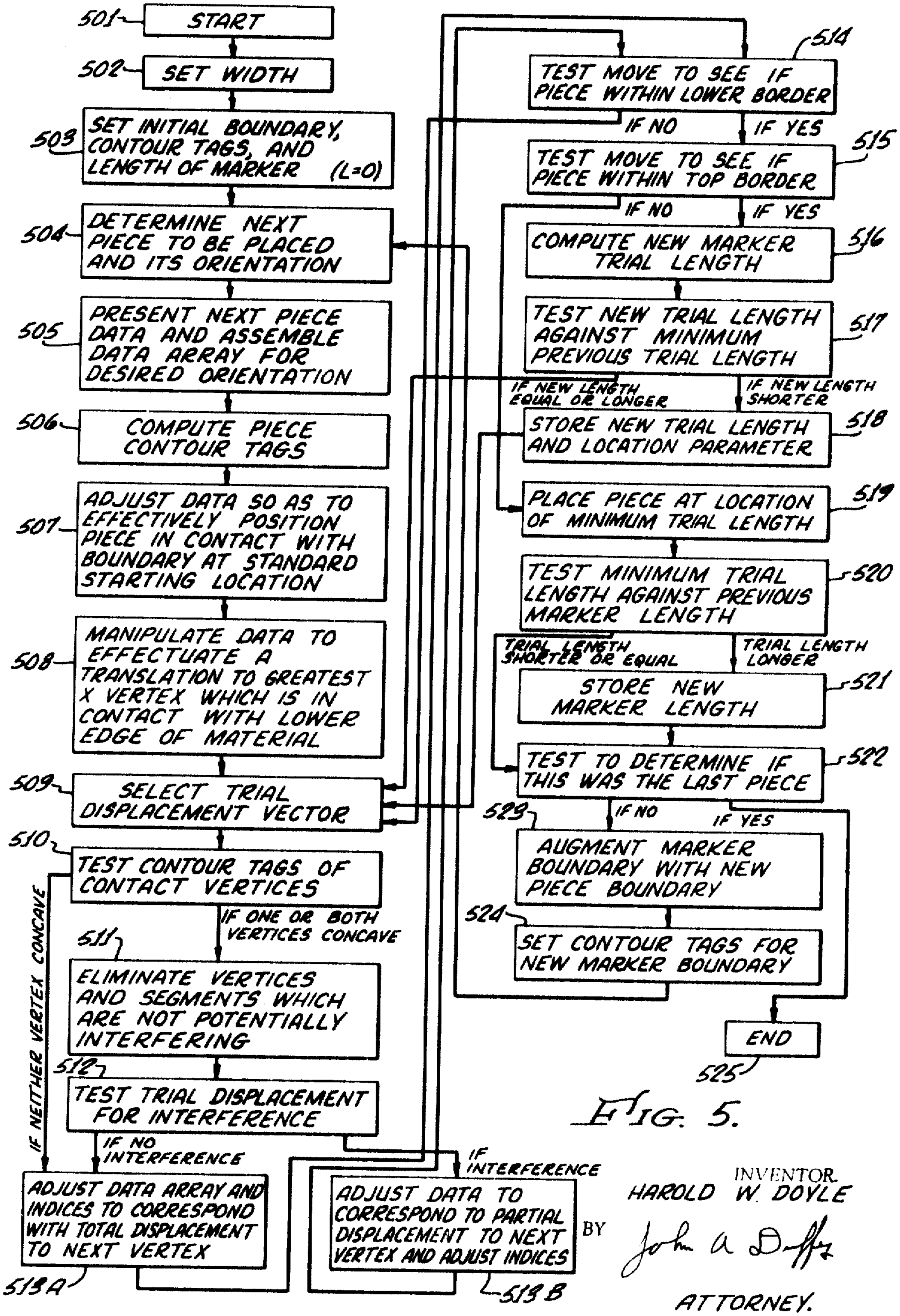
FIG. 5 shows a flow chart of the placement system.
Figure 6:
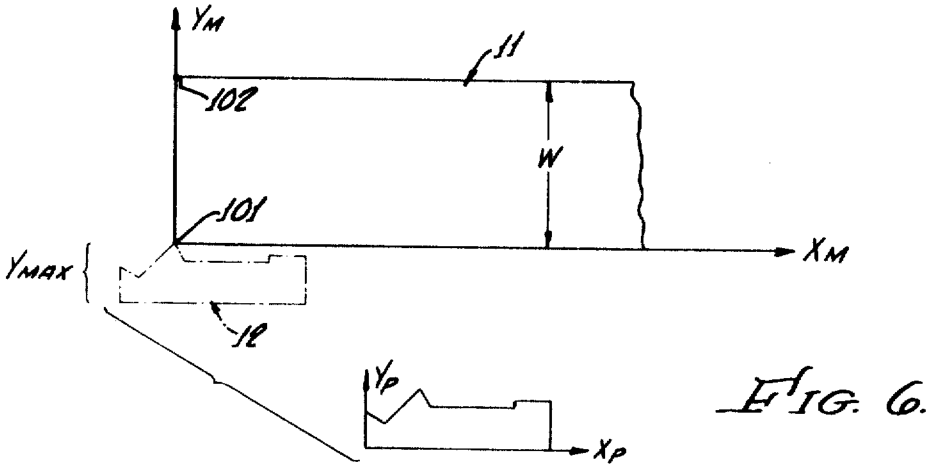
FIG. 6 shows the position of a typical piece at the standard starting location.

FIG. 5 is a flow chart showing the step-by-step sequence of the placement process. The associated data array of each piece presented for placement is first operated on (step 507) so as to translate the coordinate axes to which the piece data is referenced into the coordinate system of the material 11 in a manner which will effectively position the piece at a standard starting location in contact with the marker boundary. As shown in FIG. 6, the standard starting location for the first piece is determined by scanning the data array representing the piece for the largest Y value. The vertex represented by that particular array entry (index) is then brought into coincidence with the lower marker border point 101 of the material 11, reference, of course, being made to information presented in step 505 specifying which view of the piece (normal, reversed, inverted or reversed/inverted) is to be used. The same adjustment is made to every point in the array so that, in effect, the entire piece is displaced to the standard starting location. In this, the initial emplacement at the starting location, as well as in the subsequent step-by-step displacements of the piece to a final position, it is essential that the predetermined orientation (step 504) of the piece be maintained as previously discussed in order that the coordinate axes $X_p$ and $Y_p$ of the piece remain parallel with the coordinate axes $X_m$ and $Y_m$ of the material 11 so that only translation of the piece (and not rotation) is involved.

Figure 7:
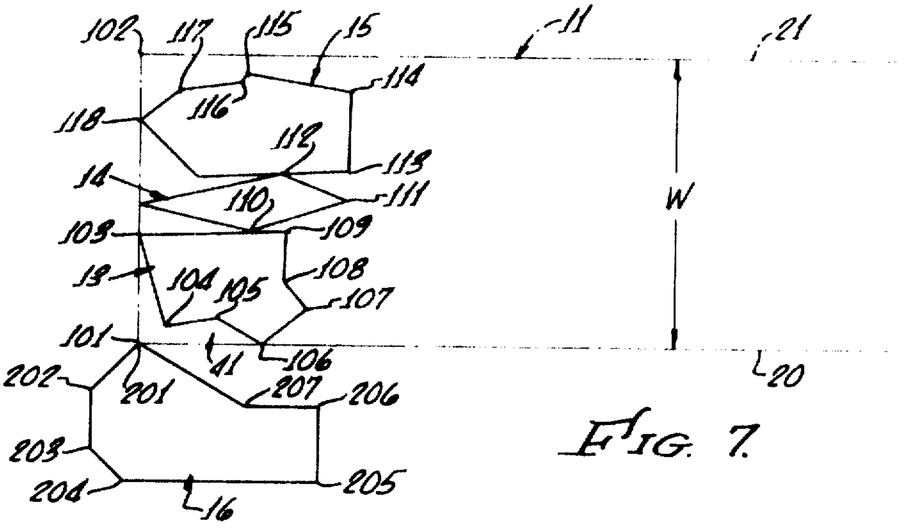
FIG. 7 shows a typical marker having three previously placed pieces and one piece at the standard starting location ready to be placed in the marker.

As shown in FIG. 7, the actual displacement of a piece 16 to a preferred location within the marker width is made by adjusting the data array, which corresponds to a physical sliding translation of the piece 16 along either piece or boundary segments (i.e., the straight line segments connecting adjacent vertices). In order to illustrate the general case, FIG. 7 shows three pieces 13, 14 and 15 which have been previously positioned by the method of the present invention and a fourth piece 16 at the starting location, it being understood that the process is equally applicable to the initial positioning of the first piece 12 (as shown in FIG. 6) against the left end border of the material 11 (i.e., the degenerate marker boundary). Once the pieces 13, 14 and 15 have been positioned, the new marker boundary is comprised of the segments connecting the points 101—106, 106—107, 107—108, 198—109, 109—110, 110—111, 111—112, 112—113, 113—114, 114—115, 115—116, 116—117, 117—118, 118—102, and 102—101. The vertex 106 may be in contact with the lower edge 20, or the vertex 115 will be in contact with the upper edge 21 of the material, depending upon which corner of the marker the first piece is scheduled to occupy, there being no obvious difference from the standpoint of material savings as to the location of the unused margin. However, for the purpose of the present explanation it will be assumed that the pieces are placed to occupy the lower area first so that the vertex 106 will be in contact with the lower edge 20.

The first move of the piece 16 from the starting location is made by augmenting its data array in a manner which corresponds to a physical translation in the X direction which will bring the vertex of the piece having the largest Y value 201 into coincidence with the largest X valued vertex 106 of the lower marker border, i.e., of the lower edge 20 of the material 11. The displacement of the piece to some preferred location within the material borders is next carried out in accordance with the teachings of the present invention described below, by a step-by-step displacement process which involves modifying the moving piece vertex coordinate information (data array) in a manner which is analogous to a physical relocation of the piece which would be accomplished if the piece were slid along one of its own segments in contact with a stationary vertex of the marker boundary or, alternatively, if the piece were slid with one of its vertices in contact along a stationary segment of the marker boundary.

Figure 8A:
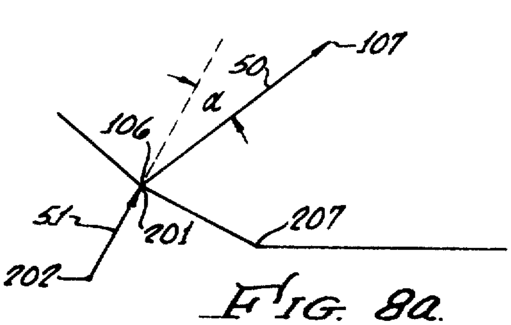
FIG. 8*a* shows the relationship where the next counterclockwise piece segment has a greater slope than the next counterclockwise boundary segment.
Figure 8B:
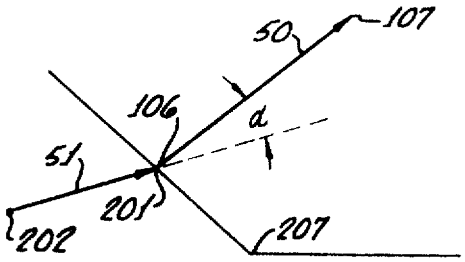
FIG. 8*b* shows the relationship where the next counterclockwise piece segment has a lesser slope than the next counterclockwise boundary segment.

In the subsequent explanation of the translational process, the course followed in displacing a piece about the stationary marker boundary has been established as one which makes reference primarily to the next "left" segments of both the piece and the boundary, the result being a counterclockwise displacement of moving piece and stationary boundary relative to one another. The choice, however, (step 509 of FIG. 5) of whether to slide a vertex of the moveable piece along a segment of stationary boundary or alternatively, whether to translate the moving piece along one of its own segments in contact with a stationary boundary vertex involves some decision making, the ultimate determination depending upon the algebraic sign of the sine of the angle formed by the two segments of interest. Referring to FIG. 8*a*, it will be seen that it is possible to translate the vertex 201 of the piece 16 relative to the line segment 50 of the stationary boundary, whereas the piece 16 may not be translated along its own segment 51 in contact with the stationary vertex 106 without overlapping the stationary boundary. The opposite is true, however, in the situation shown in FIG. 8*b*. Here the vector 51 joining the piece vertices 202 and 201 is illustrated as having a lesser slope than the vector 50 joining the vertices of the stationary boundary 106 and 107. In this case a nonoverlapping translation can only be made along the piece segment 51.

Figure 9:
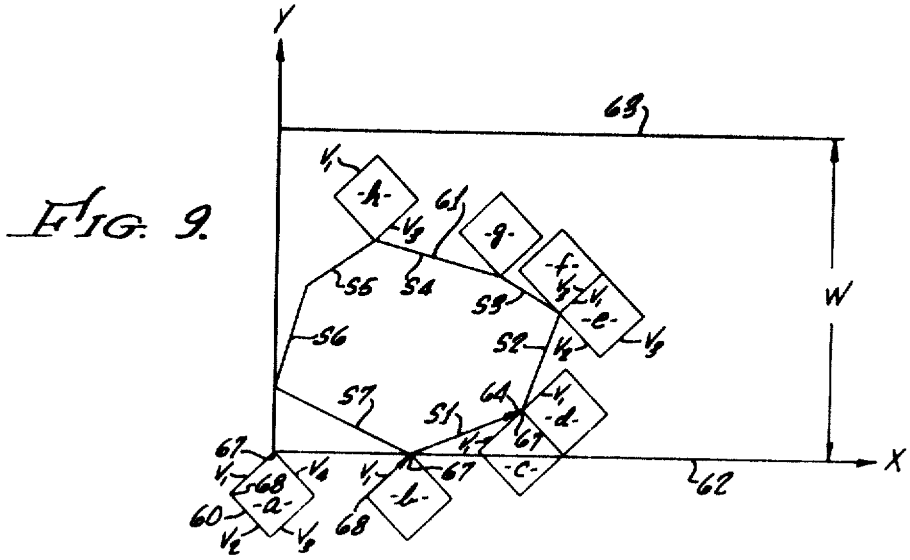
FIG. 9 shows a typical sequence of moves for displacing a piece about a marker boundary.

FIG. 9 illustrates the sequence of movement which would occur as a typical piece 60 is displaced about the stationary boundary 61 of a marker. In *a* the piece is positioned at the standard starting location (FIG. 5, Step 507). In *b* the piece has been translated to a position where its highest point is coincident with the rightmost vertex of the stationary boundary 61 which is in contact with the lower edge 62 of the material. In *c* the piece 60 has been translated from the position shown in *b* along the segment $S_1$ of the stationary boundary 61 to the vertex 64; in moving from *c* to *d* the translation is made along the side $V_1$; in moving from *d* to *e* along the boundary segment $S_2$; in moving from *e* to *f* along the piece segment $V_2$, etc. the piece moving to the left (counterclockwise) around the perimeter of the stationary boundary in a nonoverlapping fashion (from $S_1$ to $S_2$ to $S_3$, etc.) and the stationary boundary progressing in effect to the left (counterclockwise) around the piece in a nonoverlapping fashion (e.g. from $V_1$ to $V_2$ to $V_3$, etc.) as previously explained. As indicated above, unwanted overlap of the piece with the already-established marker boundary is avoided by translational sliding with respect to a piece segment or a stationary boundary segment, depending upon the relative slopes (i.e. the algebraic sign of the sine of the angles formed by the segments of interest). Thus, in FIG. 9 it will be observed that whenever the slope of the boundary segment to the left (next counterclockwise segment) of the vertices which are in contact is less than the slope of the piece segment to the left (counterclockwise) of the contacting vertices, the displacement of the piece is made along the boundary segment, whereas if the slope of the boundary segment is greater, the displacement is made along the piece segment. For example, when the piece is in position *b*, the slope of the next counterclockwise boundary segment $S_1$ is less than the slope of the next segment of the piece $V_1$ which would be encountered by a counterclockwise traversal along the piece perimeter. Accordingly, the piece 60 is displaced with its vertex 67 in contact with the segment $S_1$ until the vertices 64 an d 67 are brought together as shown in *c*. At *c* the slope $S_2$ of the next boundary segment is greater than the slope $V_1$ so that the displacement of the piece to the location shown in *d* is along the segment $V_1$ of the piece.

Figure 10:
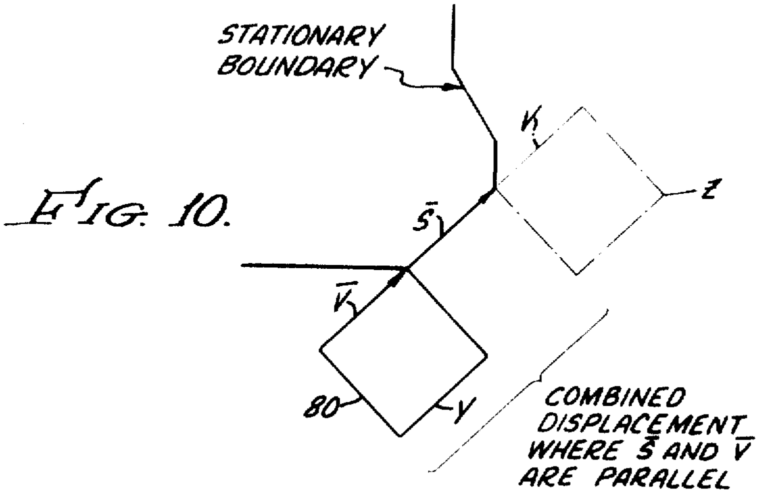
FIG. 10 shows the situation which allows a double move to be made.

In order to facilitate a choice as to which is the proper displacement segment, the segments of interest may be considered as vectors for the purpose of forming their cross product; the sine of the angle and thus the mode of displacement being determined by the sign of vector product. For example, if the slope of a vector $\bar{S}$ representing a boundary segment is less than the slope $\bar{V}$ of a vector representing a piece segment, the cross product ($\bar{S}\times\bar{V}$) will be positive. Similarly, the cross product ($\bar{S}\times\bar{V}$) will be negative where the slope of $\bar{V}$ is less than $\bar{S}$. Since by definition, the cross product ($\bar{S}\times\bar{V}$) is a vector having its direction determined by a right rotation of $\bar{S}$ into $\bar{V}$, the cross product is zero where the vectors $\bar{S}$ and $\bar{V}$ are parallel, in which case a double move may be made. The situation is illustrated in FIG. 10 where the piece vector segment $\bar{V}$ is parallel with the boundary vector segment $\bar{S}$ so as to allow a translation of the piece 80 from *y* to *z*.

Figure 11:
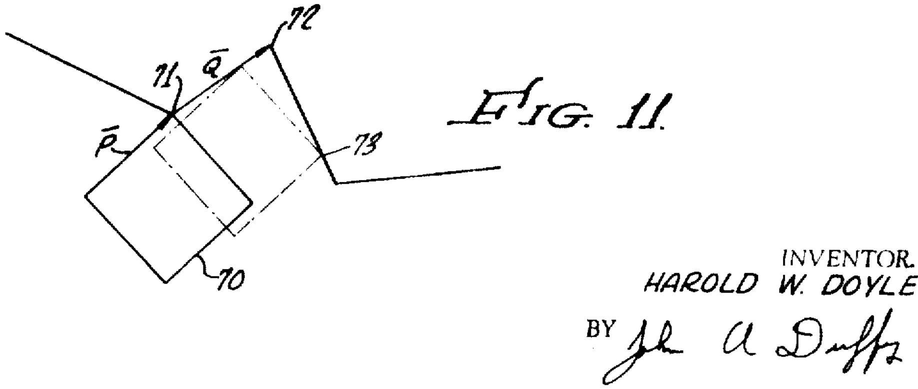
FIG. 11 shows an interference situation which may arise where concave vertices are involved.

The step-by-step displacement procedure (steps *b—h* in FIG. 9) as described above does not involve the situation where concave vertices exist. In the actual operating method of the invention, it is of course necessary to examine (as per FIG. 5, step 510) the previously determined contour tags of the contact vertices involved so that potential conflicts may be evaluated prior to displacing the piece. Thus, as shown in FIG. 11, even though the cross product ($\bar{Q}\times\bar{P}$) of the boundary vector $\bar{Q}$ and piece vector $\bar{P}$ is positive, the piece 70 may not be moved along $\bar{Q}$ from the boundary vertex 71 to 72 without a conflict, i.e., there would be an interference as indicated by the dotted position 73 before vertex 72 is reached. Accordingly, what is desired is a partial move, the mechanics of which are described at a later point hereinbelow, in order that the present description of the normal sequence of piece displacements may continue. It will be assumed therefore that an examination of the contour tags has been made as per the flow chart of FIG. 5 (step 510) and that the contour is convex or that there is no interference if the vertex is concave. If this condition exists a displacement move may be made along the full length of a segment as per step 513*a*. At each new position of the piece the updated location information is examined to determine whether the piece is within the borders (62 and 63 of FIG. 9) of the material (steps 514 and 515), and if so a new trial length of the boundary, including the piece in the new position, is computed (step 516). If the piece is within the borders 62 and 63 and the new trial length of the marker (overall X dimension) is less than the shortest previous trial length which has been computed (step 517) the new length and location data are stored for future reference (step 518). If the piece is still outside the lower border, or if the piece is within the borders but the new trial length is longer than a previously computed trial length, another move is initiated as per the procedure of step 509. If the new position of the piece exceeds the top border 63 as detected by step 515, the piece is placed (step 519) at the location which produces the smallest trial marker length, i.e., that location which has previously been determined by step 518. Now, the placement of the moving piece at the position corresponding to the least value of computed trial marker length may not in fact increase the overall marker length, because of the possibility that previously placed pieces may have left sufficient unmarked space to accommodate the new piece with no increase in accumulated marker length at this point in the process. Accordingly, a further test (step 520) is made, comparing the trial marker length with total marker length; if the trial length exceeds the total length, then the trial length becomes the new total length (step 521); otherwise, the previous total marker length is preserved for comparison following the next piece placement. A check is then made (step 522) to determine whether the last piece has been placed and if so the process is ended (step 525). Otherwise the boundary of the marker is augmented so as to include the new piece (step 523) and the appropriate contour tags of the new marker boundary established (step 524) in the manner previously described. A return is then made to step 504 where the next piece is selected and the above-described routine repeated until all of the pieces have been placed.

Figure 12:
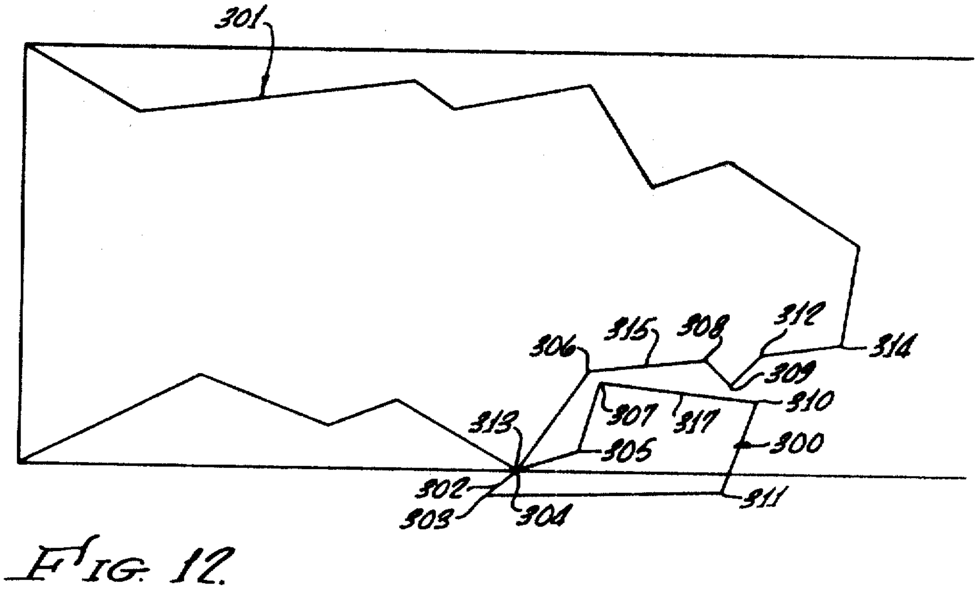
FIG. 12 shows a situation involving a plurality of interferences.
Figure 13:
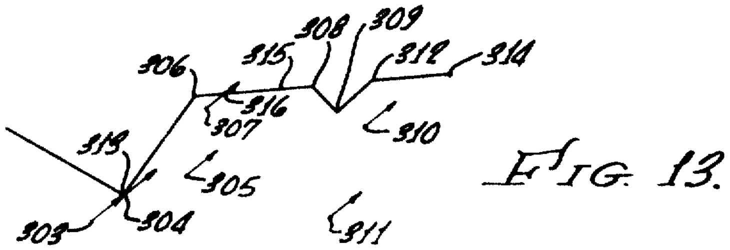
FIG. 13 illustrates how each vertex of the moving piece is tested to determine whether it will cross a segment of the stationary boundary.
Figure 14:
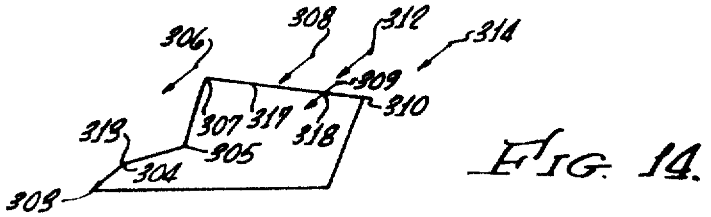
FIG. 14 illustrates how each vertex of the stationary boundary is tested to determine whether it will cross a segment of the moving piece.

As previously stated, the explanation of the mechanics of the partial move (steps 511 through 513B) was reserved in order to expedite an uninterrupted discussion of the fundamental placement routine. Accordingly, the details of partial move will now be explained. FIG. 12 shows a situation wherein both the moving piece 300 and the stationary boundary 301 have concave vertices so that the proposed displacement of the piece along the segment 302 will result in an interference. Assume, for example, that the piece is to be displaced along 302 to bring the point 303 into contact with the stationary point 313 so that the point 307 would overlap (interfere with) the area enclosed by the stationary boundary 301 and the point 309 would overlap the area of the piece 300. This potential overlap situation is of course signaled by the presence of the vertex 304 on the piece boundary and the vertex 312 on the stationary boundary (both of which would be labeled concave in accordance with the previously adopted conventions). Whether or not there will be an actual overlap is determined by calculating whether the proposed displacement of each vertex of the piece will intersect (cross) the line segments connecting the vertices of the stationary boundary and whether an oppositely directed displacement of the stationary boundary vertices would intersect (cross) the segments connecting the vertices of the piece boundary. Thus, as shown in FIG. 13, the vector displacement of each vertex 303, 304, 305, 307, 310, 311 along the segment 302 causes the vertex 307 to intersect the line segment which connects the stationary boundary vertices 306 and 308. Hence, as to this part of the test, the largest displacement which may be made along the segment 302 is that which will just cause the vertex 307 to contact the segment 315 at the point 316. In FIG. 14, the interference test is performed to determine whether the concavity on the stationary boundary (points 306, 308 thru 312) will result in an overlap when the moving piece 300 is displaced. The test is made as before, except that the moving piece 300 is considered as stationary and the stationary boundary 301 is considered as being displaced in the opposite direction—the object being to ascertain any points where the vertices of the stationary boundary 301 would cross (intersect) the line segments defining the moving piece boundary 300. As shown in FIG. 14, the vertex 309 of the stationary boundary will cross the line segment 317 (which connects the moving piece vertices 307 and 310) at the point 318. The maximum displacement for this portion of the test is thus determined by the length of the segment joining the points 309 and 318. The maximum allowable displacement may then be determined by the lesser of the distances between 309 and 318 and between the points 316 and 307.

In the above example, as illustrated in FIG. 12, only two points 307 and 309 will produce an intersection. In some situations however, there may be a plurality of intersecting points involved in each part of the test. When this occurs, the maximum allowable displacement would be determined in the same manner as above—being limited to the smallest of the displacements, i.e., that partial displacement which will bring the moving piece boundary into contact with the stationary boundary without overlap.

Figures 15, 16:
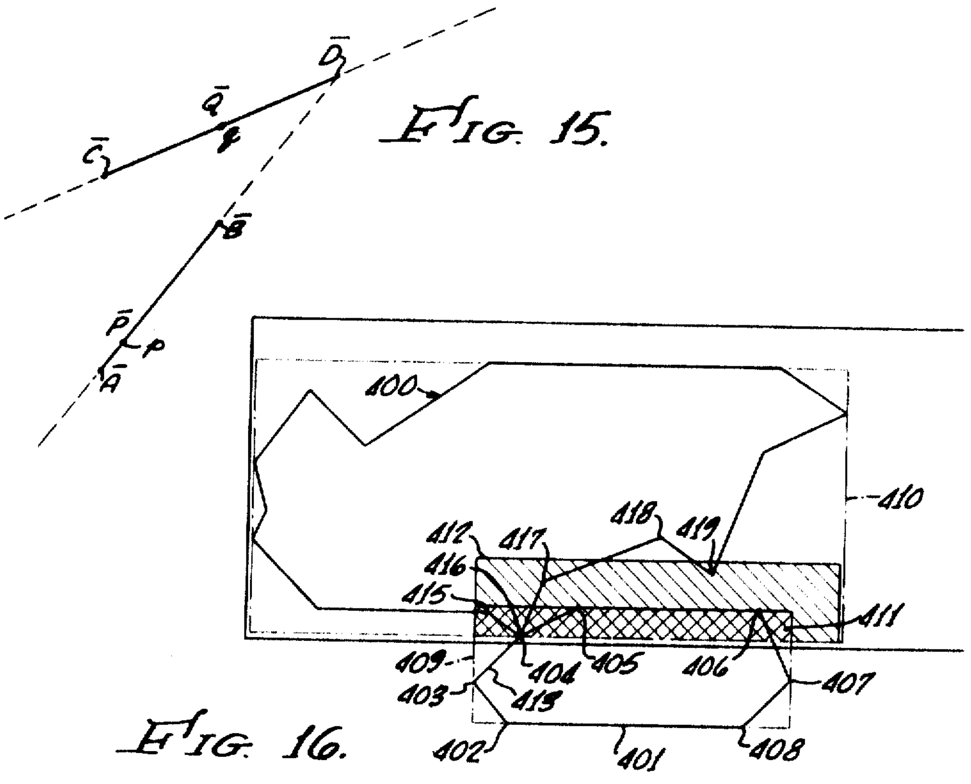
FIG. 15 illustrates the computation of the partial displacement using vector algebra.
FIG. 16 illustrates a first test for eliminating certain vertices determined to be noninterferents.

Referring to FIG. 15, the actual magnitude of the partial displacement which will result in contact of a vertex with a segment may be determined with the aid of vector equations as follows. If the displacement of a given vertex $a$ to the point $b$ is represented by the vector $\overline{B}-\overline{A}$ and the line segment joining two adjacent vertices $c$ and $d$ on the stationary boundary is represented by the vector $\overline{D}-\overline{C}$, a point $p$ which lies on some extension of the vector $\overline{B}-\overline{A}$ in either direction may be represented as $$\overline{P}=\overline{A}+(\overline{B}-\overline{A})\tau \qquad (1)$$

where $\overline{P}$ is the vector representation of the point $p$ with respect to an origin. Similarly, as to a point $q$ on the vector joining two vertices, i.e., $$\overline{Q}=\overline{C}+(\overline{D}-\overline{C})\sigma \qquad (2)$$

where $\overline{Q}$ is the vector representation of the point $q$ with respect to an origin. The above vector equations represent the position on the vectors $\overline{B}-\overline{A}$ and $\overline{D}-\overline{C}$ of any point $p$ and $q$ respectively. Thus, if in equation (1) the value of $\tau$ is zero, the point $p$ coincides with the point $a$ in FIG. 15. Similarly, if $\tau$ equals one, $\overline{P}$ coincides with point $b$. For $0<\tau<1$, the point $p$ lies between the points $a$ and $b$, and for $\tau>1$, the point $p$ lies beyond the point $b$, which would correspond to the situation where there is no interference. The same is true of the point $q$ with reference to the vector $\overline{D}-\overline{C}$, i.e., for $\sigma>1$ the point $q$ would be beyond the point $d$ and hence there would be no interference even though a full displacement of the vertex (from $a$ to $b$) is made. To determine whether there will be an interference, the equations (1) and (2) may be solved simultaneously to determine the $\sigma$ and $\tau$ which correspond to the point of intersection, i.e., setting $\overline{P}$ and $\overline{Q}$ equal there results:

$$\overline{A}+(\overline{B}-\overline{A})\tau=\overline{C}+(\overline{D}-\overline{C})\sigma \qquad (3)$$

and therefore $$(\overline{B}-\overline{A})\tau-(\overline{D}-\overline{C})\sigma=\overline{C}-\overline{A} \qquad (4)$$

Since equations (1) to (4) are vector equations, the X and Y components must also satisfy the equations, whence $$(B_x-A_x)\tau-(D_x-C_x)\sigma=C_x-A_x \qquad (5)$$

$$(B_y-A_y)\tau-(D_y-C_y)\sigma=C_y-A_y \qquad (6)$$

There results two equations (5) and (6) which may be solved simultaneously to determine the two unknowns $\sigma$ and $\tau$.

In order to facilitate the testing of proposed displacements to determine whether overlaps will occur, several tests (as described below) may be made to eliminate various points and line segments as possible interferents (step 511 on FIG. 5). Because each potentially interfering vertex on the moving piece must be tested in combination with every potentially interfering segment of the stationary boundary and vice versa, the elimination of potential interferents becomes important in reducing the computational time involved. Once the vertices which cannot possibly interfere in the move under consideration have been eliminated, the interference test may be made and $\sigma$ and $\tau$ for each of the possible combinations computed (step 512). If it turns out that $\sigma$ or $\tau$ for all possible combinations is less than "0" or greater than "1" (thus indicating a noninterfering situation), a full displacement may be made (step 513A). If, however, $\sigma$ and $\tau$ both lie between "0" and "1" for some of the combinations, a partial move is indicated (step 513B). The actual magnitude of this partial move will, as previously indicated, be equal to the product of the desired full step displacement multiplied by the smallest value of $\tau$ in those combinations wherein both $\sigma$ and $\tau$ have values between "0" and "1."

One convenient means for eliminating vertices which are not potentially interfering is illustrated in FIG. 16. In the example shown, the displacement vector will be assumed to be along the segment 413 of the moving piece 401 (as defined by the vertices 403—404). The test comprises the steps of constructing a fictitious rectangle 409 (shown dotted) which will just enclose the boundaries of the moving piece 401. Next, the stationary boundary 400 is similarly enclosed within the dotted rectangle 410. The overlapping area 411 which is common to both the rectangles 409 and 410 is enlarged in accordance with the full displacement vector 413 to produce the area 412 which will include within its boundaries any of the vertices (e.g. vertices 415—417, 419) defining the stationary boundary 400 which might possibly result in an interference with segments of the moving piece 401. The magnitude of the enlargement is determined by the area of the rectangle 412 which would be required to circumscribe the area encompassed by enlarging the overlapping rectangle 411 in accordance with the displacement vector 413. The same process of course may be applied to eliminate noninterfering vertices on the moving piece with respect to the stationary line segments the only difference being that the common area is extended backward (opposite to the direction of the displacement vector 413) into the moving piece.

Figure 17:
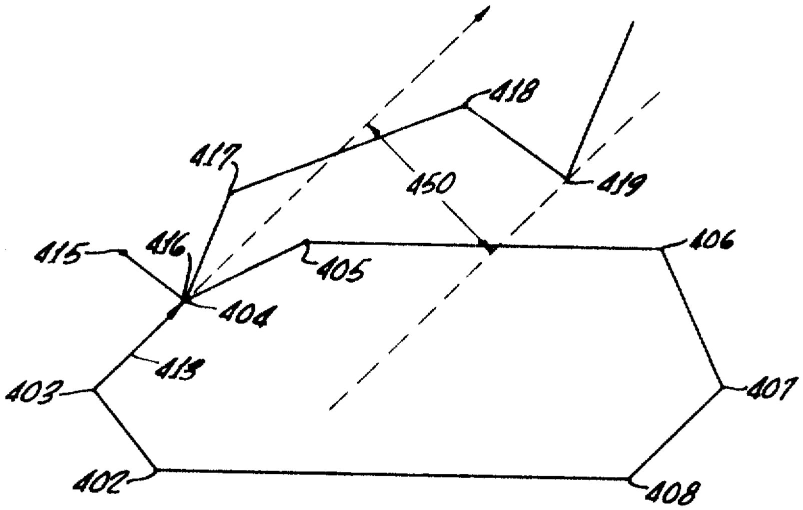
FIG. 17 illustrates a second test for eliminating additional vertices determined to be noninterferents.

In FIG. 17, a further elimination of noninterfering points is illustrated. Thus, if displacement is to be made along the vector 413, those points on the piece boundary which lie outside the corridor 450 defined by the maximum lateral displacement of points of the boundary 400 relative to the vector 413, are not potential interferents. Similarly, those points on the marker boundary lying outside the corridor 450 are also not potential interferents. Hence, such vertices as 406 on the moving piece and 417 on the stationary boundary need not be considered in determining the limiting value of $\tau$.

Assume, for example, that each of the above tests has been made (step 511) and that the noninterfering vertices have been eliminated. Assume also that the remaining potentially interfering vertices and segments have been combined to determine the smallest $\tau$ which corresponds to a partial move along the desired displacement vector which will just bring the moving piece into contact with the stationary boundary. In this situation, the data array defining the piece is adjusted to correspond with the partial move $\tau$(step 513B). It will be apparent, that the next displacement vector to be considered will be out of sequence, because the moving piece has been brought into contact with the stationary boundary at some new point. Hence, the next displacement of the piece will be relative to the new point of contact. It will thus be necessary to appropriately index the data arrays to provide for the fact that the next displacement of the piece is made by translating the new contact vertex along the newly contacted segment in a manner analogous to that previously described in connection with step 513A. It follows that the next vertices of interest (as per step 509) are those to the left of the new contact vertices and so on, the appropriate adjustment being indicated in step 513B.

Although a pattern placement routine has been described in detail, the basic concept of the invention is not limited thereto. The basic teaching of the invention may be employed in a variety of applications requiring multidimensional analysis and geometric placements. Although a preferred embodiment has been shown and described herein, it is understood that the invention is not limited thereto, and that numerous changes and substitutions may be made without departing from the spirit of the invention.

We claim:

1. A system for positioning a plurality of patterns to form a marker comprising:

a digitizer for converting the vertices of each pattern boundary to an array of cartesian coordinate data;

means for determining the contour of each vertex;

data processing means for augmenting each data array to simulate a noninterferring translation of the piece in tangential contact with the marker boundary;

means for computing and storing the marker length dimension after each move whereby the location of minimum length may be determined;

means for recording the final location of each piece to form a marker.

2. A system for marking comprising:

a digitizer for determining the coordinates of data points representing the perimeter of a piece;

means for identifying the vertices of the piece and marker boundary;

storage means for retaining the vertex coordinates of the piece and marker boundary;

means for generating vector representations of segments which connect each vertex of the piece with the next adjacent vertex of the piece;

means for generating vector representations of segments which connect each vertex of the marker boundary with the next adjacent vertex of the marker boundary;

means for determining the contour of each vertex;

means responsive to the contour information and vector representations for augmenting the vertex coordinate data to simulate a sequence of nonoverlapping translations of each piece about the previous established marker boundary;

means for computing the marker length after each move;

means for storing the computed length;

means for comparing each new computed length with previous lengths whereby the piece location which will produce the smallest increase in length may be determined.

3. A system for positioning patterns which are represented in digital form about a two-dimensional area comprising:

a digital computer for updating the digital data representing each piece to correspond to a nonoverlapping physical translation of the piece about and in contact with a preestablished boundary as defined by previously positioned pieces;

sensing means for determining the border of the area;

means for determining the new dimensions of the boundary after each simulated translation of the piece;

means for selectively storing the location of each new position of the piece which results in a smaller boundary dimension than previous locations of the piece, whereby the piece may be fitted in that location which produces the smallest increase in occupied area.

4. The combination comprising:

means for digitizing pattern boundaries;

means for tabulating the data representing each pattern to form an array;

means for arranging the arrays representing each piece in a sequence for placement within an area;

means for augmenting each data array in sequence to correspond with a physical translation of each piece to different locations within the area which is not occupied by previously positioned pieces;

means for gauging the external dimensions of the border formed by the augmented data representing the previously positioned pieces and the data representing the various locations of the piece presently undergoing translation whereby the location of the piece which produces the smallest increase in border dimensions may be determined.

5. The combination described in claim 4 wherein the means for augmenting each data array comprises a computer for arithmetically determining the new location of each data point which corresponds with a physical translation of piece in sliding contact with an already-established boundary determined by previously positioned pieces.

6. An arrangement for automatically laying out templates to reduce the amount of material utilized in marking comprising:

means for presenting a digital representation of each template in sequence;

means for manipulating the data representing each piece to correspond with a physical positioning of each piece in turn, within the borders of the material;

means for manipulating the data of each piece to correspond with a positioning of each piece in tangential contact with the boundary formed by previously positioned pieces at the location which results in the smallest increase in the dimensions of the marker;

means for augmenting the old boundary to include the addition of each piece at the location which produces the smallest increase in marker dimensions.

7. A method of laying out patterns to reduce material waste comprising the steps of:

digitizing the boundaries of each piece;

assembling the data representing each piece into an array of entries, each entry of the array to represent the X-Y coordinates of the piece vertices;

arranging the data array in a sequence;

storing the sequence of data arrays;

augmenting each data array to produce a particular view and orientation relative to the coordinate axis of the material;

computing the contour tags at each piece vertex;

scanning the data array representing each piece to determine the vertex having the largest Y value;

augmenting each data array to correspond with positioning each piece to have the vertex with the largest Y value coincident with the lower boundary of the material;

augmenting each data array to correspond with translation of each piece to bring the vertex of the piece having the largest value into coincidence with the furthest vertex of the boundary formed by previously positioned pieces which is tangent with the lower border of the material;

operating upon the data arrays to generate the vector equations representing the line segments connecting the piece vertices;

operating upon the data representing the boundary formed by previously positioned pieces to generate therefrom the vector equations representing the line segments connecting the boundary vertices;

computing the contour tags at each vertex of the preestablished boundary;

multiplying the piece vector to the left of the contact vertices by the boundary vector to the left of the contact vertices to form the vector product for determining a displacement vector along which a nonoverlapping translation may be made;

augmenting the piece data to correspond with a series of displacements which may be either nonoverlapping full translation of the piece in sliding contact with the boundary to a new vertex or a nonoverlapping partial translation of the piece in sliding contact with the boundary to a point of contact with the boundary as determined by the contour information;

testing the new position of the piece after each displacement to determine whether the piece is within the borders of the material;

comparing the length of the boundary after each displacement to determine whether the new location of the piece will result in a marker whose length is less than that of previous locations of the piece; storing the location information of the piece where the piece is within the boundaries of the material and the new location of the piece results in a shorter marker than previous positions of the piece, whereby the data array representing each piece may be augmented to place the piece at a location which will produce the smallest increase in marker length.

8. (The method described in claim 8 wherein the manipulation of the digitized data to simulate a positioning of each piece in sequence within the borders of the material comprises the steps of:) A method for laying out the pieces on a material comprising the steps of:

digitizing the piece perimeters;

transforming the digitized data representing each piece to correspond with a physical location of the piece within the borders of the material;

manipulating the digitized data to simulate a positioning of each piece in sequence within the borders of the material to a location which will produce the smallest increase in marker length, said manipulating steps comprises:

forming the vector representations of the segments connecting each vertex of the piece;

forming the vector representations of the segments connecting each vertex of the marker boundary;

identifying the contour at each piece and boundary vertex;

positioning the piece to be in a nonoverlapping tangential contact with the marker boundary;

multiplying contacting vectors together to form the cross product;

testing the sign of the cross produce to determine the displacement vector;

calculating the magnitude of the displacement to be made according to the contour information;

augmenting the data to simulate the piece displacement in accordance with the previously established magnitude and direction;

examining the marker length after each move to determine whether the new length is smaller than a previous length;

storing the data representing the location of the piece which results in a shorter marker length than previous positions of the piece whereby the location of the piece within the border which results in the shortest marker length may be determined.

9. (The method described in claim 8 wherein the manipulating of the digitized data to simulate a positioning of each piece in sequence within the borders of the material comprises the steps of:) A method for laying out the pieces on a material comprising the steps of:

digitizing the piece perimeters;

transforming the digitized data representing each piece to correspond with a physical location of the piece within the borders of the material;

manipulating the digitized data to simulate a positioning of each piece in sequence within the borders of the material to a location which will produce the smallest increase in marker length, said manipulating steps comprises:

augmenting the data to correspond with bringing each piece into tangential contact with the marker boundary formed by previously positioned pieces;

selecting the magnitude and direction of each displacement move which corresponds to a nonoverlapping translation of the piece in sliding contact with the marker boundary;

augmenting the data to correspond with a piece displacement in accordance with the previously established magnitude and direction;

testing the marker length after each move of the piece to determine the location which produces the smallest increase in marker dimensions;

augmenting the old boundary data to include the piece as positioned at the location which produces the smallest increase in marker dimension;

selecting the next piece for placement.

10. The method described in claim 9 wherein the selection of the magnitude and direction of each displacement move comprises the steps of:

forming the vector representation of the segments connecting each vertex of the piece;

forming the vector representations of the segments connecting each vertex of the marker boundary;

identifying the contour at each piece and boundary vertex;

positioning the piece to be in a nonoverlapping tangential contact with the marker boundary;

multiplying contacting vectors together to form the cross product;

testing the sign of the cross products to determine the displacement vector;

calculating the magnitude of the displacement to be made according to the contour information.

11. A method of positioning patterns to reduce material waste comprising the steps of:

computing the contour tags of the vertices representing each piece;

computing the contour tags representing the boundary formed by previously positioned pieces;

adjusting the data representing each piece to correspond with positioning each piece in turn at a starting location;

selecting a trial displacement vector for each displacement of each piece;

testing the contour tags of contact vertices to determine whether potential overlap exists;

testing the boundary- and piece-defining data to determine whether a total displacement of concave contact vertices will produce an actual overlap;

calculating the magnitude of the maximum nonoverlapping partial displacements which may be made;

adjusting the data representing each piece to correspond with a total displacement to a new vertex or a partial displacement to a new point of nonoverlapping contact;

testing the new location of each piece after each displacement to determine whether the piece is within the borders of the material;

computing the boundary dimensions after each displacement;

adjusting the piece data to correspond with positioning each piece at the location which results in the smallest increase in boundary dimensions.

12. The method recited in claim 11 wherein the calculating of the magnitude of a partial displacement of a piece comprises the steps of:

superposing the trial displacement vector on each vertex of the piece to be displaced;

determining whether the superposed trial displacement vectors will interfere with the segments connecting adjacent vertices of the boundary formed by previously positioned pieces;

superposing an oppositely directed trial displacement vector on each vertex of the boundary formed by previously positioned pieces;

determining whether the oppositely directed displacement vectors will interfere with the segments connecting adjacent vertices of the piece;

calculating the point of intersection of each interfering displacement vector with a segment to determine the maximum nonoverlapping partial displacement which may be made.

13. The method recited in claim 12 wherein is included the steps of testing the piece and boundary to eliminate vertices and segments which are not potentially interferring.

14. The method recited in claim 13 wherein the steps of testing the piece and boundary to eliminate vertices and segments which are not potentially interfering comprises the steps of:

constructing a first circumscribing rectangle about the piece;

constructing a second circumscribing rectangle about the boundary formed by previously positioned pieces;

superposing the trial displacement vector and an oppositely directed trial displacement vector on each corner of the rectangular area which is common to said first and second rectangles;

expanding the rectangular area which is common with said first and second rectangles to include the positive trial displacement vectors at each corner;

expanding the rectangular area which is common with said first and second rectangles to include the negative trail displacement vectors at each corner;

eliminating all vertices and segments outside the expanded rectangular areas as being not potentially interfering.